United States Patent
Schank et al.

(10) Patent No.: US 9,180,966 B2
(45) Date of Patent: *Nov. 10, 2015

(54) ACTUATION SYSTEM FOR AN ACTIVE ELEMENT IN A ROTOR BLADE

(75) Inventors: Troy C. Schank, Keller, TX (US); Peter H. Kintzinger, Grapevine, TX (US); Jonathan A. Knoll, Burleson, TX (US); Christopher E. Foskey, Grand Prairie, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 592 days.

This patent is subject to a terminal disclaimer.

(21) Appl. No.: 13/596,110

(22) Filed: Aug. 28, 2012

(65) Prior Publication Data

US 2014/0064965 A1 Mar. 6, 2014

(51) Int. Cl.
 *B64C 27/615* (2006.01)
 *B64C 27/72* (2006.01)

(52) U.S. Cl.
 CPC ....... *B64C 27/615* (2013.01); *B64C 2027/7266* (2013.01); *Y02T 50/34* (2013.01)

(58) Field of Classification Search
 CPC ......... F01D 7/00; B64C 27/54; B64C 27/615; B64C 27/72; B64C 2027/7261; B64C 2027/7266; B64C 2027/7277; B64C 3/50; B64C 9/16; B64C 9/18; Y02T 50/34
 USPC .................. 416/1, 23, 24, 95; 74/89.2, 89.21, 74/89.22; 318/6, 7, 9, 14, 560, 561, 135
 See application file for complete search history.

(56) References Cited

U.S. PATENT DOCUMENTS

| | | | |
|---|---|---|---|
| 2,716,460 A * | 8/1955 | Young | 416/24 |
| 3,140,066 A | 7/1964 | Sutton et al. | |
| 5,137,228 A | 8/1992 | Vaughen | |
| 6,168,379 B1 * | 1/2001 | Bauer | 416/23 |
| 6,273,681 B1 * | 8/2001 | Yamakawa et al. | 416/23 |
| 6,499,690 B1 * | 12/2002 | Katayama et al. | 244/17.11 |

(Continued)

FOREIGN PATENT DOCUMENTS

| | | |
|---|---|---|
| EP | 1035015 A2 | 9/2000 |
| EP | 1645504 A2 | 4/2006 |

OTHER PUBLICATIONS

Extended European Search Report in related European Application No. 12190507.9, dated Jul. 22, 2013, 7 pages.

(Continued)

*Primary Examiner* — Craig Kim
*Assistant Examiner* — Brian P Wolcott
(74) *Attorney, Agent, or Firm* — Noah A. Tevis (57) ABSTRACT

In accordance with one embodiment of the present application, an actuation system is configured for actuation of an airfoil member with a flap mechanism. The actuation system can include an upper drive tape and a lower drive tape, each partially wrapped around a first bearing and second bearing. An inboard frame can be actuated by at least one linear actuator. Similarly, an outboard frame can be actuated by at least one linear actuator. The inboard frame is coupled to the upper drive tape, while the outboard frame is coupled to the lower drive tape. An actuation of the inboard frame and outboard frame in a reciprocal manner acts move a flap input lever reciprocally upward and downward. A flap mechanism is configured to convert the movement of the flap input lever into rotational movements of the airfoil member.

18 Claims, 11 Drawing Sheets

(56) References Cited

U.S. PATENT DOCUMENTS

| | | | |
|---|---|---|---|
| 7,762,770 B2 | 7/2010 | Sun et al. | |
| 7,837,144 B2 * | 11/2010 | Kothera et al. | 244/99.2 |
| 8,657,228 B2 * | 2/2014 | Schank et al. | 244/99.2 |
| 2007/0001550 A1 | 1/2007 | Palanduz et al. | |

OTHER PUBLICATIONS

Notice of Allowance, 71(3) in related European Application No. 13172183.9, dated Oct. 24, 2014, 34 pages.
Notice of Allowance, 71(3) in related European Application No. 13172182.1, dated Oct. 21, 2014, 31 pages.
European Communication in related European Application No. 12190507.9, dated Jul. 21, 2014, 4 pages.
European Search Report in related European Application No. 13172183.9, dated Nov. 13, 2013, 3 pages.
European Search Report in related European Application No. 13172182.1, dated Nov. 13, 2013, 3 pages.
Office Action in related European Application No. 13172183.9, dated Nov. 25, 2013, 4 pages.
Office Action in related European Application No. 13172182.1, dated Nov. 25, 2013, 5 pages.
Office Action in related U.S. Appl. No. 13/596,099, dated May 11, 2015, 17 pages.
Notice of Allowance, 71(3) in related European Application No. 12190507.9, dated Feb. 5, 2015, 36 pages.
Canadian Office Action in related Canadian App. No. 2,823,179, dated Nov. 28, 2014, 4 pages.
Canadian Office Action in related Canadian App. No. 2,823,197, dated Jan. 27, 2015, 4 pages.
Canadian Office Action in related Canadian App. No. 2,823,185, dated Jan. 23, 2015, 4 pages.

* cited by examiner

ACTUATION SYSTEM FOR AN ACTIVE ELEMENT IN A ROTOR BLADE

BACKGROUND

1. Technical Field

The present application relates to an active element actuation system for a rotor blade.

2. Description of Related Art

It can be desirable to implement an actively controlled aerodynamic member on a rotor blade to improve rotor blade performance during aircraft operation. One conventional design uses a push/pull rod connected to a bell crank on a trailing edge flap. Such a configuration can have several undesirable limitations. For example, the bell crank can penetrate the profile of the rotor blade, thereby negatively increasing the drag. Further, rod end elements can have high coulomb friction and produce an uneven stick-slip motion. Even further, wear over time can eventually produce backlash from mechanical slop between the actuator and the flap, thereby reducing controllability of the flap. Even further, conventional designs can include a potential single point failure, such as a ball screw on an electromechanical actuator, which is susceptible to a mechanical jam.

Hence, there is a need for an improved actuation system for an active element on a rotor blade.

DESCRIPTION OF THE DRAWINGS

The novel features believed characteristic of the system of the present application are set forth in the appended claims. However, the system itself, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Illustrative embodiments of the system are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figures 1, 2:
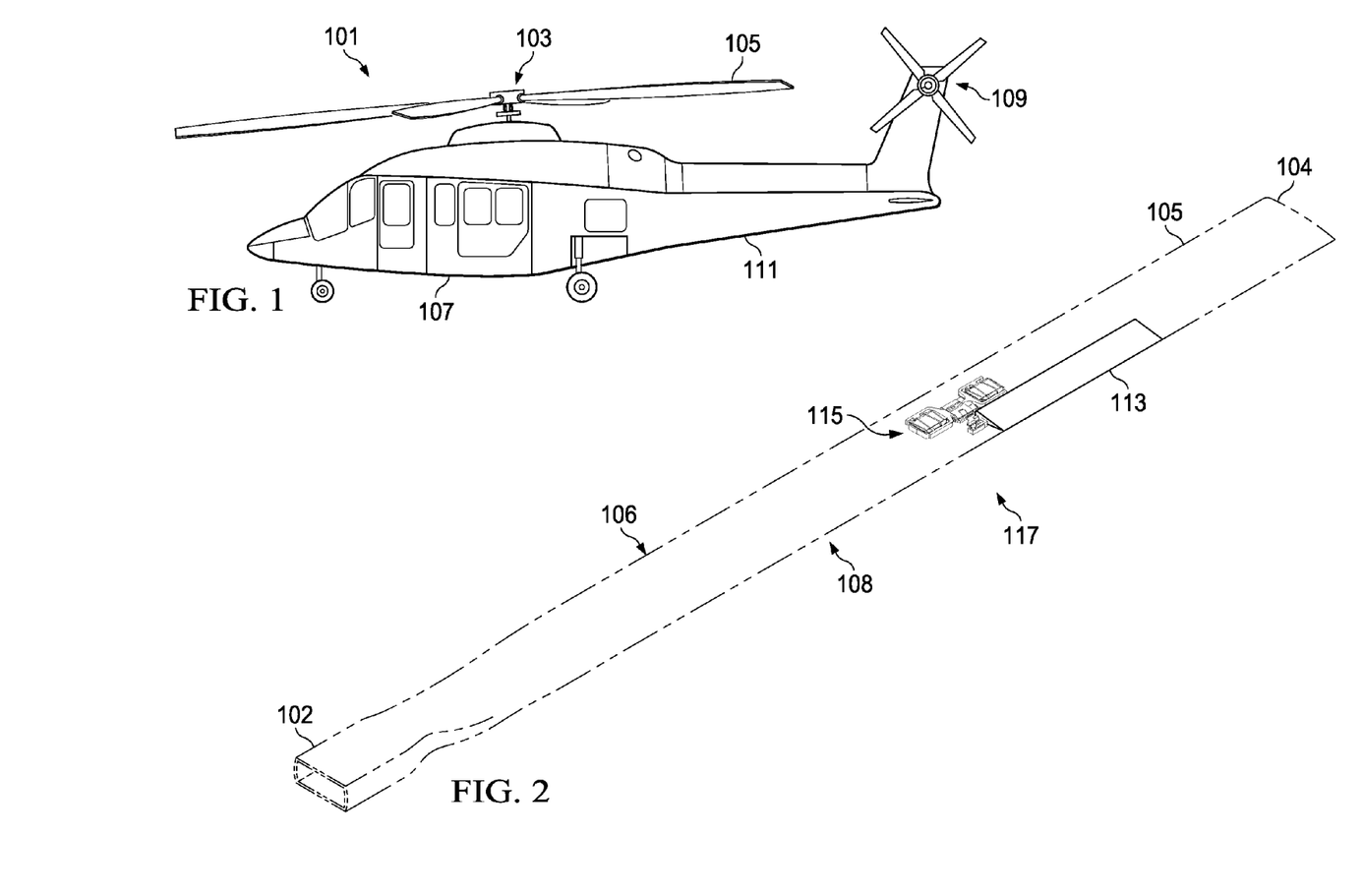
FIG. 1 is a side view of an aircraft having a rotor blade with an active flap, according to one example embodiment.
FIG. 2 is a perspective view of the rotor blade with the active flap, according to one example embodiment.

Referring now to FIG. 1 in the drawings, a rotorcraft 101 is illustrated. Rotorcraft 101 has a rotor system 103 with a plurality of rotor blades 105. The pitch of each rotor blade 105 can be managed in order to selectively control direction, thrust, and lift of rotorcraft 101. Rotorcraft 101 can further include a fuselage 107, anti-torque system 109, and an empennage 111.

Referring now also to FIG. 2, an example rotor blade 105 is illustrated in further detail. Rotor blade 105 has a root end 102, a tip end 104, a leading edge portion 106, and a trailing edge portion 108. Each rotor blade 105 can include a flap 113 that is actively actuated by an actuation system 115. Actuation system 115 is configured to selectively actuate flap 113 so as to provide enhancements of over fixed rotor blade geometry designs, such as: vibration reduction, acoustic reduction, and improved aerodynamic performance. Actuation system 115 is lightweight, compact, wear resistant, and powerful, thereby realizing benefits of an active rotor blade.

It should be appreciated that rotorcraft 101 is merely illustrative of a wide variety of aircraft that can implement the systems discloses herein, such as actuation system 115 for actuating an airfoil member on a rotor blade. Other aircraft implementations can include hybrid aircraft, tilt rotor aircraft, unmanned aircraft, gyrocopters, and a variety of helicopter configurations, to name a few examples. Further, trailing edge flap 113 is merely illustrative of a wide variety of moveable airfoil members that can be actuated with actuation system 115 and flap mechanism 117. For example, a leading edge droop is another illustrative moveable airfoil surface that can be actuated with actuation system 115. Further, it should be appreciated that a plurality of actuation systems 115 may be employed on a single rotor blade 105.

Figure 3:
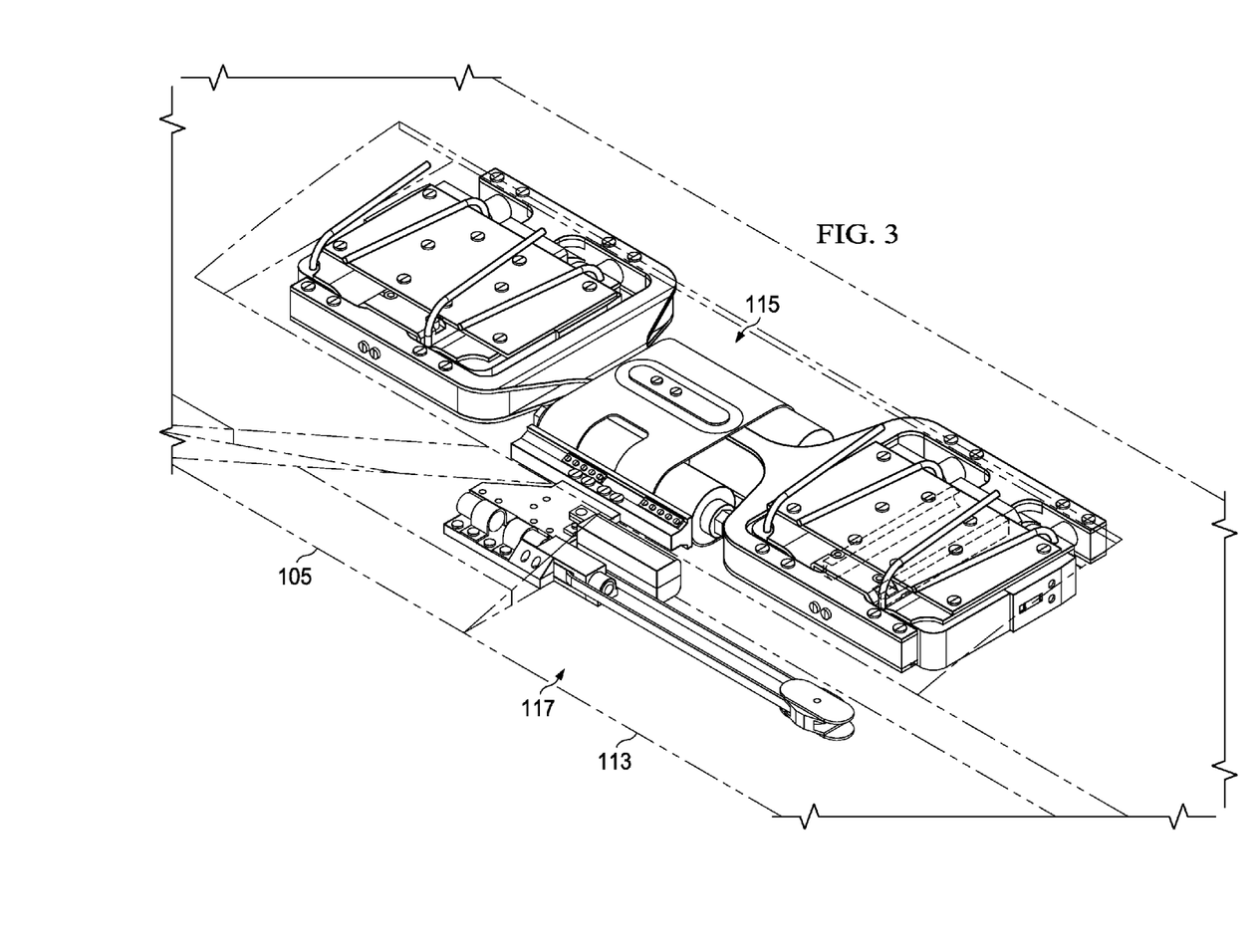
FIG. 3 is a perspective view of an actuation system and a flap mechanism for actuating the active flap, according to one example embodiment.
Figure 4:
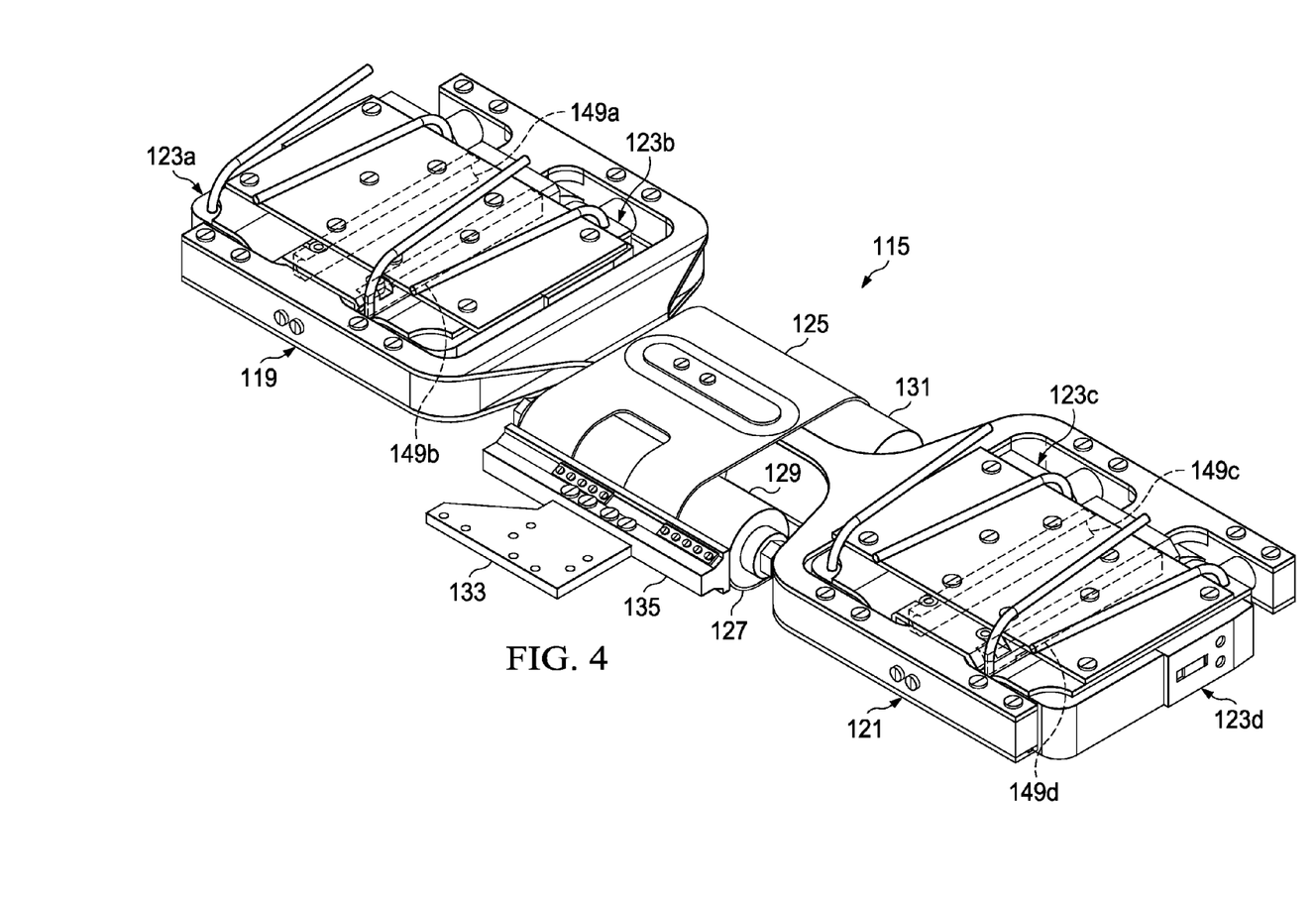
FIG. 4 is a perspective view of the actuation system, according to one example embodiment.
Figure 5:
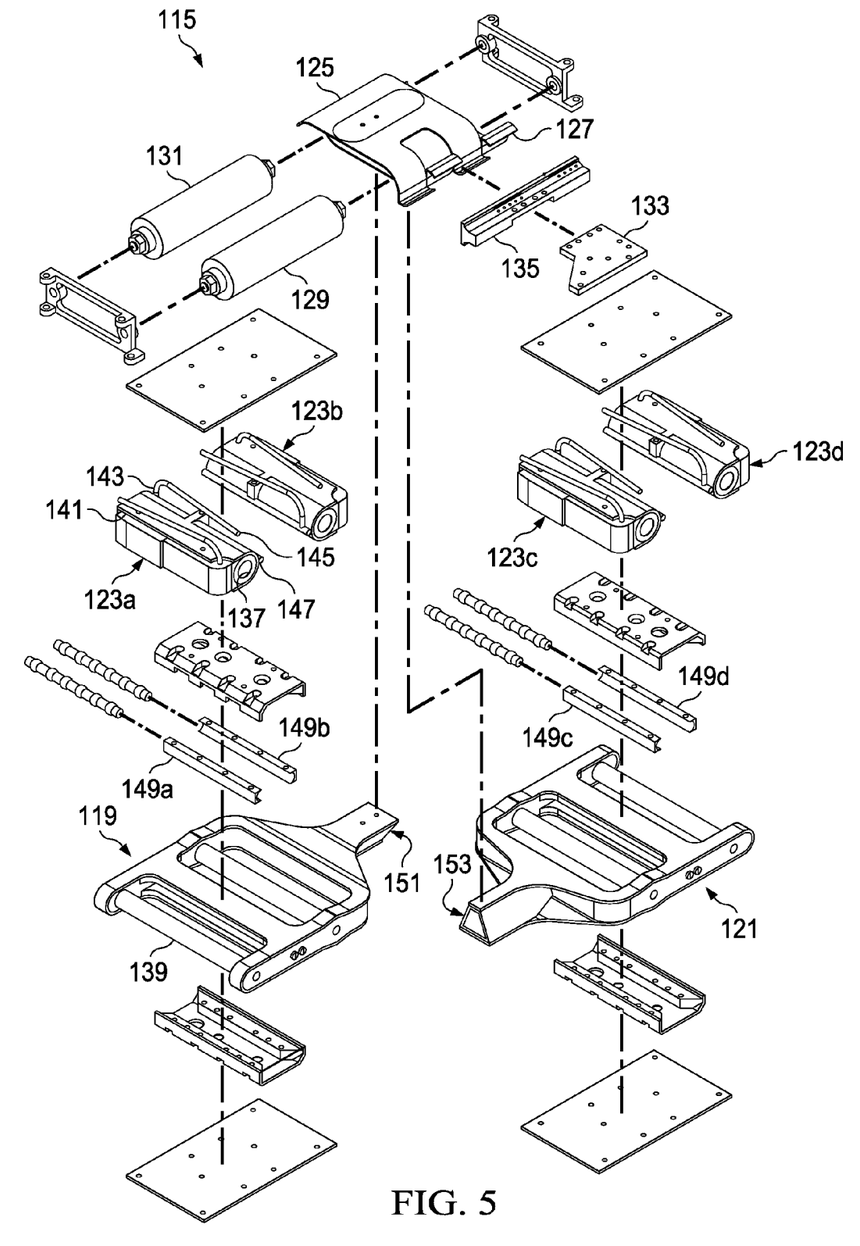
FIG. 5 is an exploded view of the actuation system, according to one example embodiment.
Figure 6:
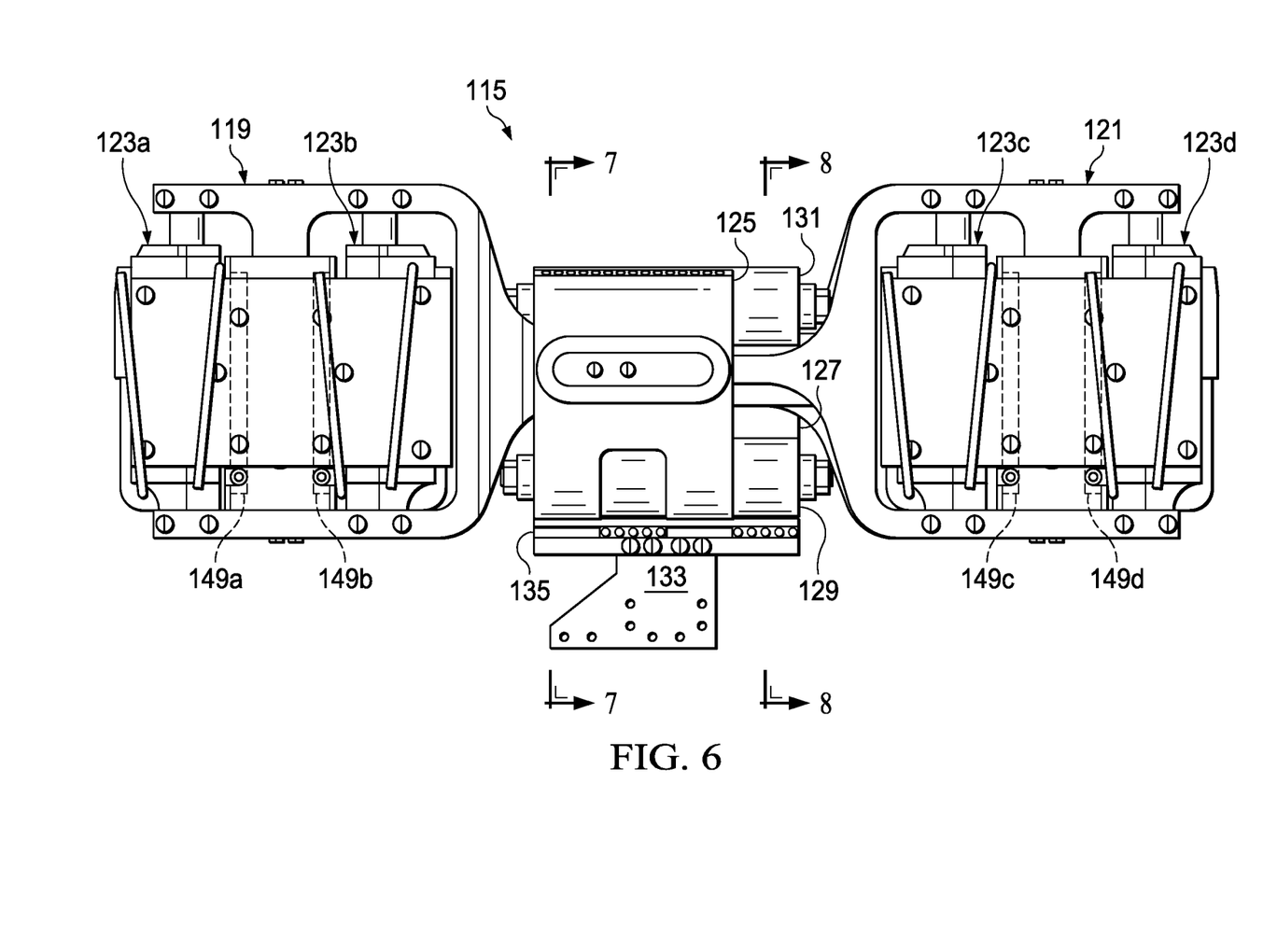
FIG. 6 is a top view of the actuation system, according to one example embodiment.

Referring now also to FIG. 3, actuation system 115 can be operably associated with a flap mechanism 117. Flap mechanism 117 is configured to receive inputs from actuation system 115 and mechanically convey the inputs to trailing edge flap 113, while also reacting centrifugal forces subjected upon trailing edge flap 113 during operation, as discussed further herein. Even though flap mechanism 117 is illustrated in conjunction with actuation system 115, flap mechanism 117 can be implemented on a rotor blade having an actuation system that is different from actuation system 115.

Referring now also to FIGS. 4-8, actuation system 115 is described in further detail. Actuation system 115 can include an inboard frame 119 operably associated with linear actuators 123a and 123b. Similarly, actuation system 115 can include an outboard frame 121 operably associated with linear actuators 123c and 123d. It should be appreciated that an alternative embodiment of actuation system 115 can include a fewer or greater number of linear actuators. In the interest of clarity, linear actuator 123a is further described; however, it should be appreciated that linear actuators 123b-123d are preferably identical to linear actuator 123a. Further, inboard frame 119 is substantially similar to outboard frame 121, as such, in the interest of clarity, redundant features between frame 119 and frame 121 may only be discussed with regard to one or the other.

Linear actuator 123a can include a stator 137 having a plurality of conductive windings, and a forcer 139 having a plurality of magnets. Forcer 139 can be linearly displaced at a selected frequency and magnitude by a control system that selectively applies a control signal to stator 137. Forcer 139 is rigidly coupled to frame 119, thus linear translation of forcer 139 similarly translates frame 119. It should be appreciated that linear actuator 123a is merely illustrative of a wide variety of linear actuators that can be suitable for generating linear motion with suitable displacement and frequency characteristics. For example, linear actuator 123a can be a linear motor, pneumatic cylinder, or pneumatic muscle, to name a few.

The stator portion of linear actuator 123a can be located in a housing 141 that is configured to secure stator 137 relative to the internal structure of rotor blade 105. Further, housing 141 can be configured as a heat sink so as to provide a conductive path for removing heat generated by linear actuator 123a. As such, housing 141 is preferably made from a heat conductive material, such as aluminum, for example.

A plurality of heat pipes 143 can used to provide efficient heat transfer from housing 141 to an exterior surface of rotor blade 105. Each heat pipe 143 includes an evaporator end 147 and a condenser end 145. The evaporator end 147 is in thermal contact with housing 141. Thermal grease can be used to promote thermal contact between the evaporator end 147 and housing 141. The condenser end 145 is in a thermal path with a rotor blade structure such that heat can be transferred to an exterior surface of rotor blade 105.

During operation, each heat pipe 143 transfers heat from housing 141 to an exterior surface of rotor blade 105, where the heat can dissipate into the ambient air. Further, airflow over the exterior surface of rotor blade 105 acts to further remove heat via convection.

Each heat pipe 143 is formed at an angle such that operational centrifugal forces promote condensed fluid to travel from condenser end 145 to evaporator end 147. The angle in each heat pipe 143 is formed by a bend located approximately mid-length of heat pipe 143. The angle of the bend is configured so that condenser end 145 can approximately conform and have maximum contact area with the exterior surface structure rotor blade 105. Further, the angle of the bend in each heat pipe 143 is also configured so that evaporator end 147 can have maximum contact area with housing 141. The thickness and camber of rotor blade 105 can affect the specific angle of the bend in heat pipe 143. For example, a rotor blade having a small thickness between upper and lower airfoil surfaces may have a smaller bend angle, as compared to a rotor blade having a large thickness between upper and lower airfoil surfaces. The unique location and orientation of heat pipes 143 allows for the utilization of centrifugal forces to overcome the undesirable force of gravity and promote the return of the condensed working fluid from condenser end 145 to evaporator end 147.

Actuation system 115 can further include linear bearing assemblies 149a-149d to support inboard frame 119 and outboard frame 121 against each housing 141 of linear actuators 123a-123d, while reducing friction during the relative linear translation therebetween. Further, each linear bearing assembly 149a-149d is configured to prevent increased friction due to operationally generated spanwise centrifugal forces. Even though linear bearing assemblies 149a-149d are illustrated, it should be appreciated that linear actuators 123a-123d can be moveably supported against frames 119 and 121 using any variety of suitable configurations, such a bearings, gears, slidable elements, to name a few examples.

Inboard frame 119 is reciprocally driven by actuators 123a and 123b acting in unison. If one of actuators 123a or 123b were to fail, the remaining healthy actuator can provide continued operation while overcoming the slight parasitic drag of the failed actuator. Similarly, outboard frame 121 is reciprocally driven by actuators 123c and 123d acting in unison. However, actuation system 115 is configured such that actuators 123a and 123b translate inboard frame 119 in an opposite direction to the translation direction of outboard frame 121 by actuators 123c and 123d, the translations being in an oscillatory manner, as discussed further herein.

An extension 151 of Inboard frame 119 is coupled to an upper drive tape 125. Similarly, an extension 153 of outboard frame 121 is coupled to a lower drive tape 127. Upper drive tape 125 and lower drive tape 127 can be metal tapes that elastically deform when bent around a pulley. Upper drive tape 125 and lower drive tape 127 are configured to withstand very high frequency motion bending cycles. It should be appreciated that upper drive tape 125 and lower drive tape 127 can be of any material or combination of materials that are able to withstand a high number of bending cycles. For example, upper drive tape 125 and lower drive tape 127 can be formed with 17-7 TH1050 stainless steel and have a thickness of approximately 0.004 inch.

Figure 7:
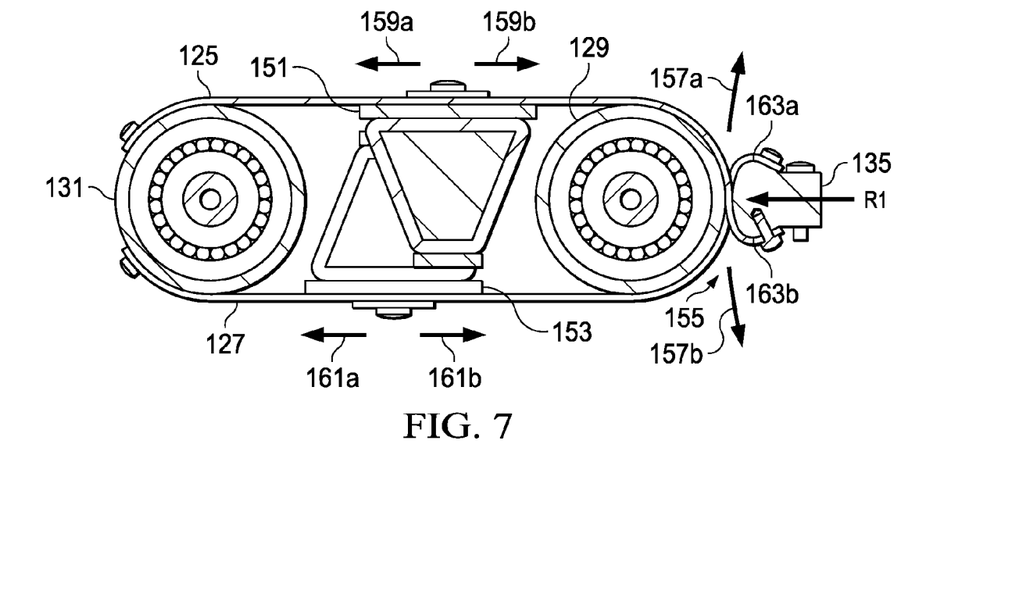
FIG. 7 is a partial cross-sectional view of the actuation system, taken at section lines 7-7 in FIG. 6, according to one example embodiment.
Figure 8:
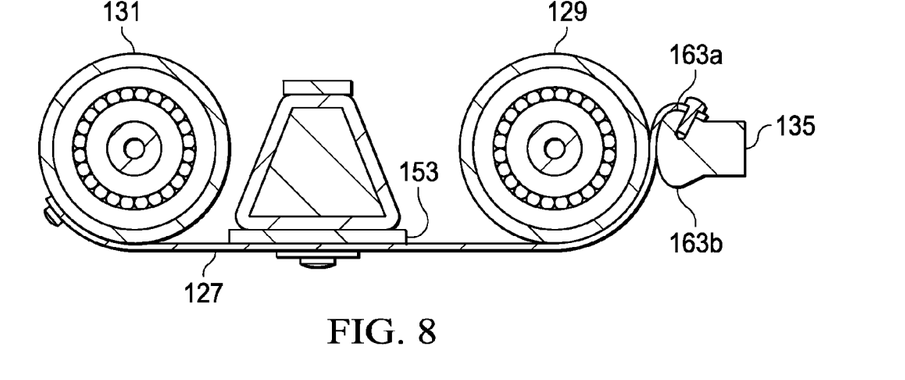
FIG. 8 is a partial cross-sectional view of the actuation system, taken at section lines 8-8 in FIG. 6, according to one example embodiment.

Referring in particular to FIGS. 7 and 8, a first end portion of upper drive tape 125 is coupled to a second bearing 131 such that a portion of upper drive tape 125 is in contact with a radial surface of second bearing 131. The second end portion of upper drive tape 125 is coupled to a lower portion 163b of coupler 135. Upper drive tape 125 is in contact with a radial portion of first bearing 129 before partially wrapping around a radial portion 155 of coupler 135 and being coupled to a lower portion 163b. Similarly, a first end portion of lower drive tape 127 is coupled to second bearing 131 such that a portion of lower drive tape 127 is in contact with a radial surface of second bearing 131. The second end portion of lower drive tape 127 is coupled to an upper portion 163a of coupler 135. Lower drive tape 127 is in contact with a radial portion of first bearing 129 before partially wrapping around radial portion 155 of coupler 135 and being coupled to a upper portion 163a. It should be appreciated that even though first bearing 129 and second bearing 131 are illustrated as cylindrically shaped, first bearing 129 and second bearing 131 can have other shapes, such as a cam shape, for example. First bearing 129 and second bearing 131 preferably are positioned to place upper drive tape 125 and lower drive tape 127 in tension. Upper drive tape 125 and lower drive tape 127 are configured so that they don't physically overlap each other. In the illustrated embodiment, openings in upper drive tape 125 and lower drive tape 127 allows each to partially wrap around first bearing 129 and attach to coupler 135 without contacting each other.

During operation, inboard frame 119 is actuated reciprocally in directions 159a and 159b, while outboard frame 121 is actuated reciprocally in directions 161a and 161b. A translation of inboard frame 119 in direction 159a causes coupler 135 to be pulled in an upward direction 163a by upper drive tape 125. Conversely, a translation of outboard frame 121 in direction 161a causes coupler 135 to be pulled in a downward direction 163b by lower drive tape 127. A ratio between a radius R1 of radial portion 155 of coupler 135 and the outer radius of first bearing 129 forms the mechanical advantage of the transmission of actuation system 115. In such a configuration, linear actuators 123a-123d move the flexible drive tapes 125 and 127 which directly displaces the flap input lever 133 that is coupled to coupler 135. The magnitude and frequency of the reciprocal translations of frames 119 and 121 can be selectively controlled during operation.

One advantage of the configuration of actuation system 115 is that inboard frame 119 and outboard frame 121 translate in opposite chordwise directions such that the inertial forces reactions cancel each other, resulting in a system that is not adversely affected by chordwise accelerations of the rotor blade that can occur during operation of the aircraft. For example, lead/lag accelerations are an example of chordwise accelerations of the rotor blade that can be manifest during operation of the aircraft. The unique configuration of actuation system 115 allows it to be substantially unaffected by such lead/lag accelerations.

Figure 9:
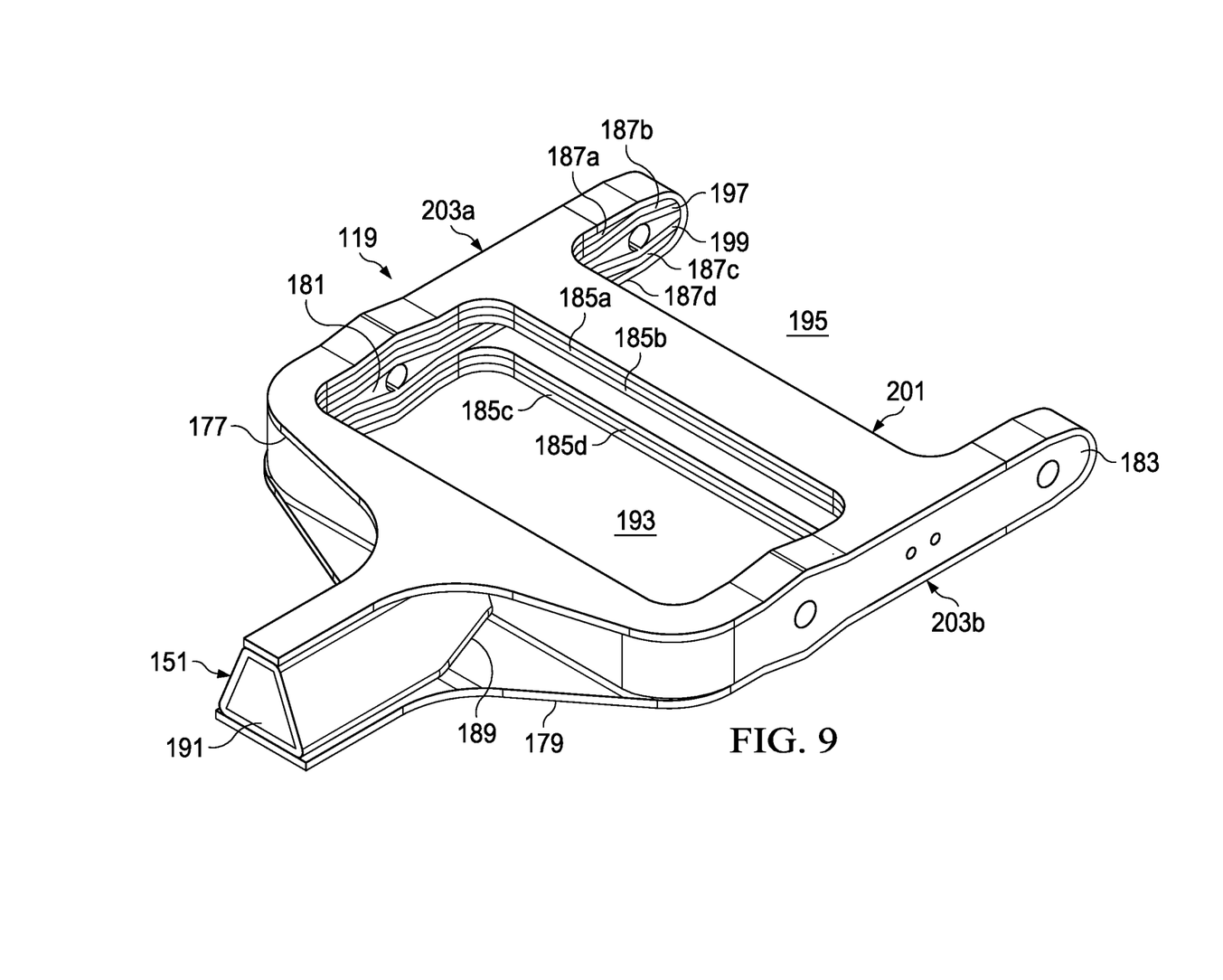
FIG. 9 is a perspective view of the inboard frame, according to one example embodiment.
Figure 10:
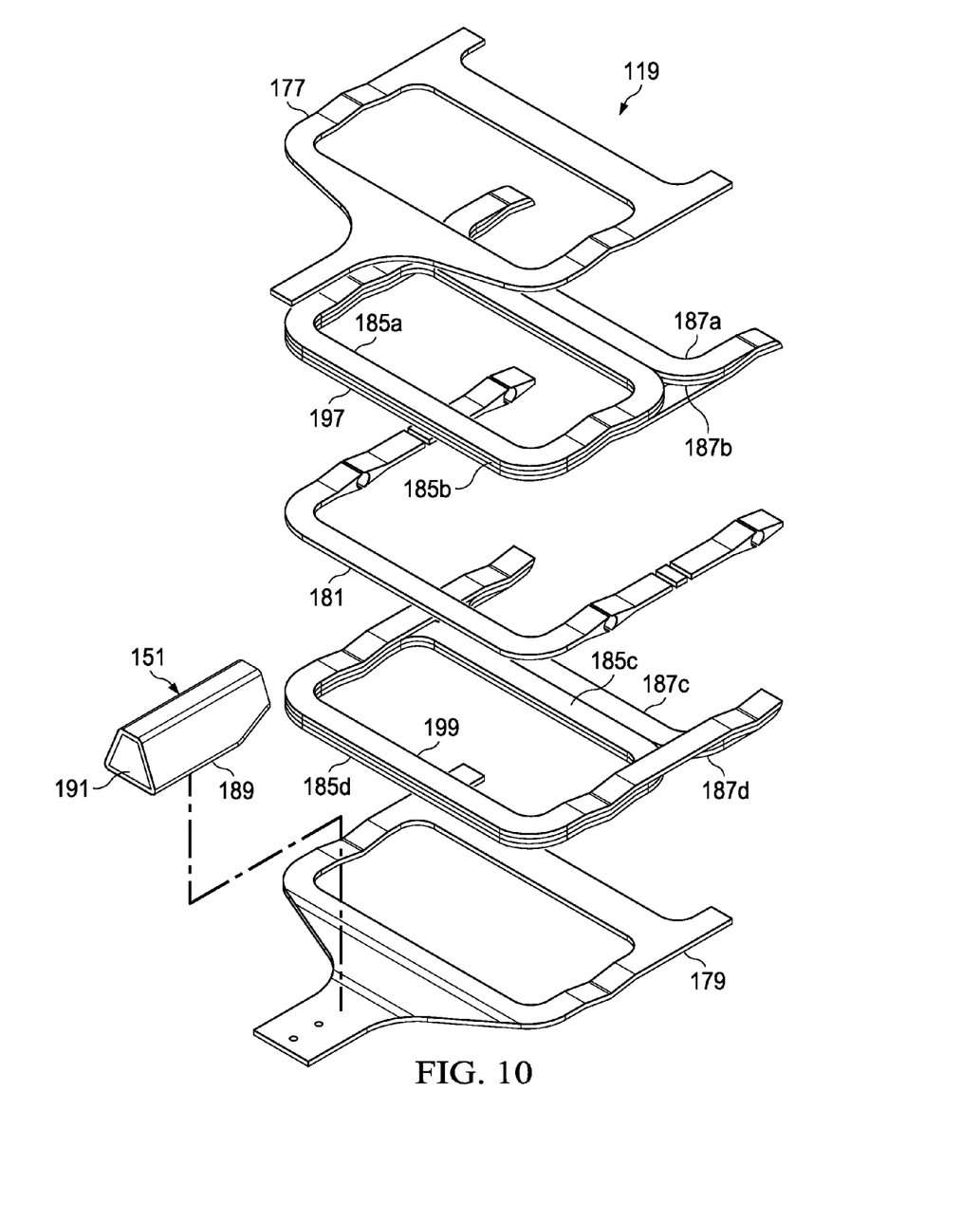
FIG. 10 is an exploded view of the inboard frame, according to one example embodiment.

Referring now also to FIGS. 9 and 10, inboard frame 119 is illustrated in further detail. It should be appreciated that outboard frame 121 is substantially similar to inboard frame 119, and that for the sake of conciseness only inboard frame 119 is shown in FIGS. 9 and 10. Inboard frame 119 is configured to have considerable stiffness and strength to react operational loading and prevent the operational loading from manifesting as deflection where extension 151 is coupled to upper drive tape 125. Deflection of inboard frame 119 could otherwise distort upper drive tape 125 during operation, so as to undesirably reduce the fatigue life of upper drive tape 125.

Inboard frame 119 can be an assembly of composite members and layers configured for rigidly transferring linear displacements of actuators 123a and 123b to upper drive tape 125. Inboard frame 119 can include a full pocket 193 and a partial pocket 195 sized to accommodate actuators 123a and 123b, thereby forming a brace member 201 extending between arms 203a and 203b. It should be appreciated that inboard frame 119 can be modified to accommodate a greater or fewer number of actuators. In an alternative embodiment, inboard frame 119 can include a full pocket in lieu of partial pocket 195, thereby forming an additional brace member.

Inboard frame 119 can include an upper plate 177 and a lower plate 179, each having multidirectional fibers embedded in a resin matrix. A center plate 181 can be located at the center between upper plate 177 and lower plate 179. Tracks 185a-185d are formed with unidirectional fibers wound in a racetrack pattern thereby forming full pocket 193 therewithin. Similarly, tracks 187a-187d are formed with unidirectional fibers wound in a racetrack pattern, but subsequently trimmed in half to form the geometry of partial pocket 195. An outer member 183 can be included around the exterior. Upper shoe layer 197 and lower shoe layer 199 are formed with unidirectional fibers wound in a racetrack pattern, but also subsequently trimmed to form a horseshoe shaped layer.

Extension 151 can include a filler 191 enclosed by a shell 189. In the illustrated embodiment, filler 191 is a closed-cell foam filler that is trimmed to the desired shape. Shell 189 is a multidirectional composite member that encloses filler 191 to form a rigid torsion box. Shell 189 and filler 191 are butt jointed to outer member 183. Upper plate 177 and lower plate 179 add rigidity by providing a shear support path between torsion box shell 189 and tracks 185a-185d and tracks 187a-187d.

It should be appreciated that even though extension 151 forms a trapezoidal shape cross-section shape, extension 151 may be configured in other shapes that also perform rigidly in torsion and bending. For example, extension can form a square or rectangular shape.

Inboard frame 119 and outboard frame 121 are configured to act stiff in torsion and bending so that operational loading does not result in deflection at extension 151. Deflection of extension 151 is undesirable because it could result in a wrinkling of upper drive tape 125 and lower drive tape 127, thereby reducing fatigue life.

Figure 11:
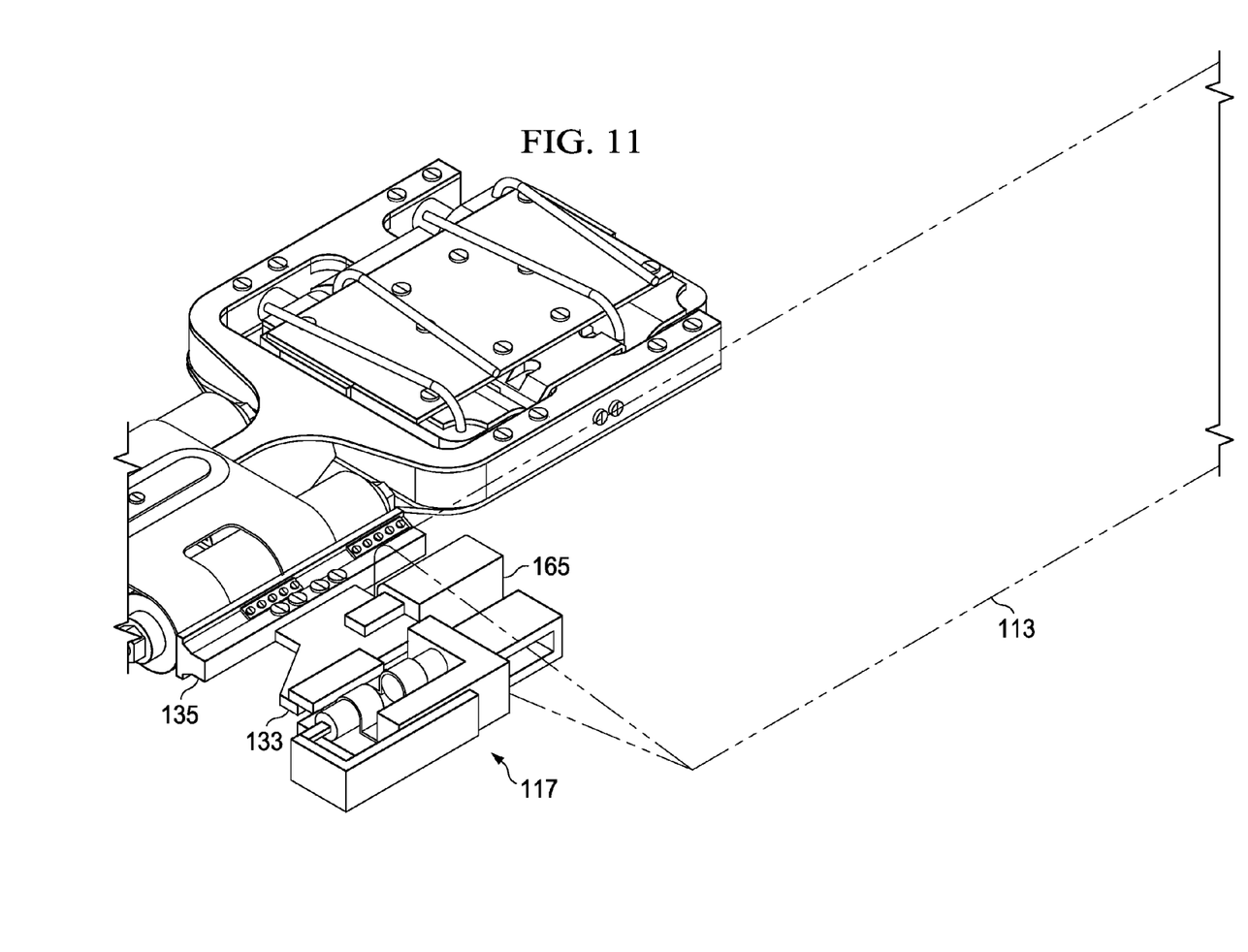
FIG. 11 is a perspective view of the flap mechanism, according to one example embodiment.
Figure 12:
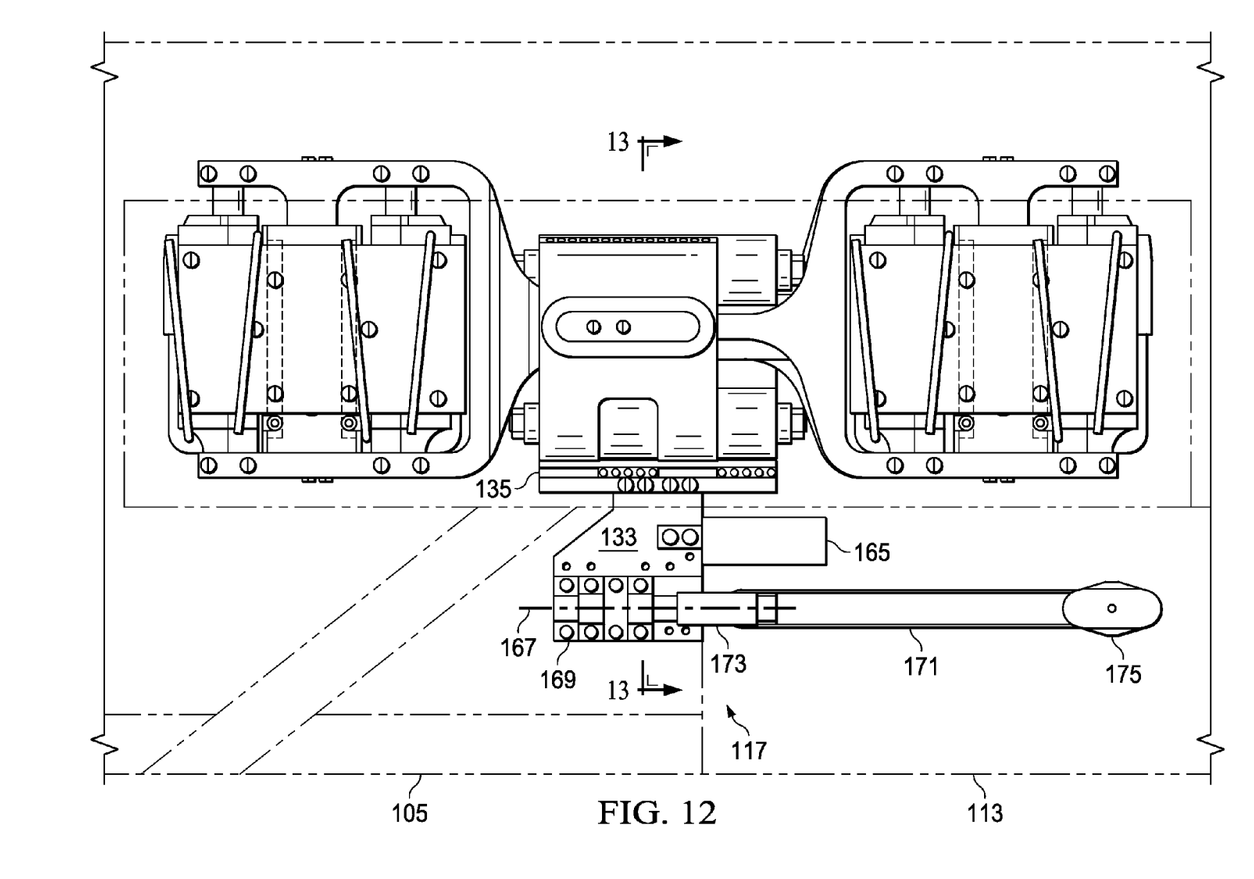
FIG. 12 is a top view of the flap mechanism and the actuation system, according to one example embodiment.
Figure 13:
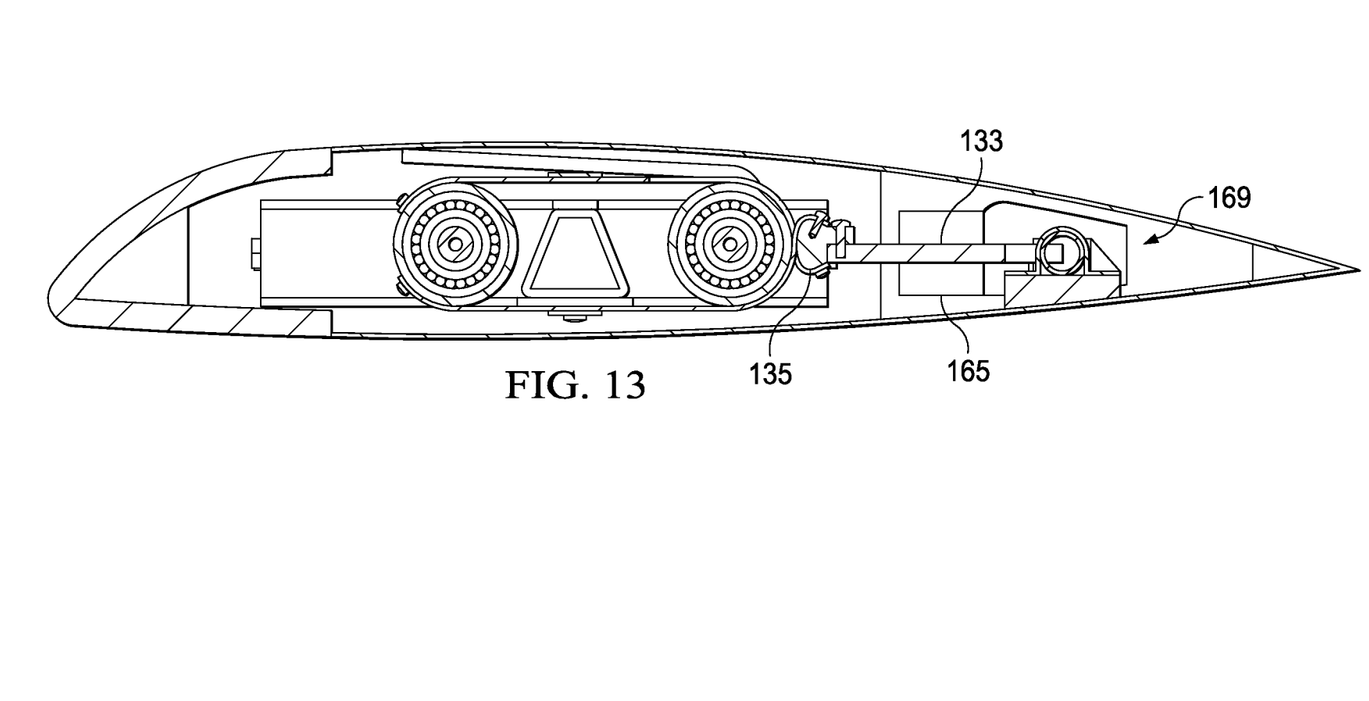
FIG. 13 is a partial cross-sectional view of the flap mechanism and the actuation system, taken at section lines 13-13 in FIG. 12, according to one example embodiment.

Referring now also to FIGS. 11-13, flap mechanism 117 is described in further detail. Flap mechanism 117 can include a clevis 165 that is rigidly coupled to flap 113. Clevis 165 slidingly engages flap input lever 133 such that rotational inputs from flap input lever 133 result in rotational movements of flap 113 about a hinge axis 167. Clevis 165 is configured such that spanwise operational loads, such as centrifugal forces, are not reacted between clevis 165 and flap input lever 133. Rather, centrifugal forces are reacted by a tension-torsion member 171 that is support by an inboard support 173 and an outboard support 175. Inboard support 173 is fixed relative to rotor blade 105. In the illustrated embodiment, inboard support 173 is coupled to a fixed portion of a hinge assembly 169. Outboard support 175 is fixed relative to flap 113. During operation, tension-torsion member 171 is compliant in torsion to allow for the relative rotation between flap 113 and rotor blade 105. Furthermore, tension-torsion member 171, under tension, stretches in the spanwise direction when reacting centrifugal loads that act upon flap 113. In such a configuration, neither clevis 165, flap input lever 133, nor hinge assembly 169 react the centrifugal loads. Hinge assembly 169, as well as any other hinges between flap 113 and rotor blade 105, is configured with slack in the spanwise direction so that a spanwise movement of flap 113 is not reacted by hinge assembly 169, or other hinges defining hinge axis 167. One benefit is that this configuration of flap mechanism 117 prevents centrifugal loads from causing a spanwise deflection of flap input lever 133 and coupler 135, thereby preventing an undesired wrinkling of upper drive tape 125 and lower drive tape 127.

In the illustrated embodiment, tension-torsion member 171 is a composite band member with fiberglass fibers oriented unidirectionally along the lengthwise axis in a racetrack type configuration; however, the exact composite material and fiber orientation is implementation specific. It should be appreciated that tension-torsion member 171 can be manufactured with a variety of suitable materials. Furthermore, alternative embodiments of tension-torsion member 171 can include mechanical assemblies configured to react centrifugal loads while being compliant in torsion. Such an alternative embodiment can include a cylindrical rod assembly having a bearing, such as an elastomeric bearing, that exhibits the desired tension and torsion properties.

During operation of rotorcraft 101, a control system is configured to command actuation system 115 to actuate flap 113 at a desired frequency and displacement. Actuation system 115 is configured to provide angular displacement of flap 113 of up to positive 10 degrees and negative 10 degrees, for example. Further, actuation system 115 is configured to provide actuation frequencies at least from zero to 30 hertz, for example. The angular displacement and frequency can be continuously changed during operation. Further, actuation system 115 can be operated to provide a large angular displacement at a low frequency (such as once per blade revolution) and low displacements at a high frequency (such as 6 times per blade revolution). The displacement and frequency can be continuously adjusted to achieve one or more desirables, such as vibration reduction, aircraft hover performance, aircraft speed performance, and/or aircraft fuel efficiency, to name a few examples.

The systems of the present application include one or more significant advantages over conventional systems, such as: 1) the actuation system has high bandwidth and large displacement; 2) the actuation system has frames that move in opposite directions so as to negate chordwise loading of the rotor blade; 3) the flap mechanism allows the spanwise position of the flap to float, thereby preventing centrifugal loading from being reacted by the actuation system; 4) the actuation system does not protrude from the normal aerodynamic profile of the rotor blade; 5) the actuation system has a long fatigue life; 6) the actuation system and flap mechanism are scalable to larger and smaller rotor blades; 7) the actuation system can incorporate multiple actuators for redundancy; and 8) the actuation system is resistant to the formation of backlash.

The particular embodiments disclosed above are illustrative only, as the system may be modified and practiced in different but equivalent manners apparent to those skilled in the art having the benefit of the teachings herein. Modifications, additions, or omissions may be made to the apparatuses described herein without departing from the scope of the invention. The components of the system may be integrated or separated. Moreover, the operations of the system may be performed by more, fewer, or other components.

Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

The invention claimed is:

1. A flap mechanism configured for translating a moveable airfoil surface on a rotor blade, the flap mechanism comprising:
   an input lever that is rotatable about a rotational axis, the input lever being coupled to an upper drive tape and a lower drive tape, the upper drive tape and the lower drive tape each being elastically deformable and configured to alternately pull the input lever so that the input lever reciprocally rotates about the rotational axis; and
   a clevis fitting fixed to the moveable airfoil surface, the clevis fitting also being slidingly coupled to the input lever such that the clevis fitting allows a translation of the moveable airfoil surface in a spanwise direction relative to the input lever, such that a rotational input from the input lever causes the moveable airfoil surface to rotate about the rotational axis.

2. The flap mechanism according to claim 1, further comprising:
   a hinge assembly defining the rotational axis.

3. The flap mechanism according to claim 1, further comprising:
   a tension-torsion member coupled to a rotor blade structure and the moveable airfoil surface, the tension-torsion member being configured to react centrifugal forces experienced by the moveable airfoil surface.

4. The flap mechanism according to claim 3, wherein the tension-torsion member is a composite band member.

5. The flap mechanism according to claim 3, wherein the tension-torsion member is a composite band member with fibers oriented in a unidirectional pattern.

6. The flap mechanism according to claim 3, wherein the tension-torsion member is configured to torsionally twist when the moveable airfoil surface is rotated about the rotational axis.

7. The flap mechanism according to claim 3, wherein the tension-torsion member is coupled to the moveable airfoil surface with an outboard support.

8. The flap mechanism according to claim 3, wherein the tension-torsion member is coupled to the rotor blade structure with an inboard support.

9. The flap mechanism according to claim 1, wherein the moveable airfoil surface is a trailing edge flap.

10. The flap mechanism according to claim 1, wherein the clevis fitting includes an upper arm positioned above the input lever and a lower arm positioned below the input lever.

11. A rotor blade having a moveable airfoil member, the rotor blade comprising:
    a root end and a tip end that define a spanwise direction therebetween;
    a leading edge and a trailing edge that define a chordwise direction therebetween;
    an actuation system comprising:
       a first bearing and a second bearing;
       an upper drive tape and a lower drive tape, wherein each of the upper drive tape and the lower drive tape is elastically deformable;
       a first linear actuator and a second linear actuator;
       an inboard frame operably associated with the first linear actuator, the inboard frame being coupled to the upper drive tape;
       an outboard frame operably associated with the second linear actuator, the outboard frame being coupled to the lower drive tape;
    a flap mechanism comprising:
       an input lever coupled to the upper drive tape and the lower drive tape, the input lever being rotatable about a rotational axis;
       a clevis fitting fixed to the moveable airfoil member, the clevis fitting also being slidingly engaged to the input lever such that the clevis fitting allows a translation of the moveable airfoil member in the spanwise direction relative to the input lever, but that a rotational input from the input lever causes the moveable airfoil member to rotate about the rotational axis;
    wherein a reciprocal translation of the first frame and the second frame results in a reciprocal movement of the input lever.

12. The rotor blade according to claim 11, the flap mechanism further comprising:
    a hinge assembly defining the rotational axis of the moveable airfoil member.

13. The rotor blade according to claim 11, the flap mechanism further comprising:

a tension-torsion member coupled to a rotor blade structure and the moveable airfoil member, the tension-torsion member being configured to react centrifugal forces experienced by the moveable airfoil member.

14. The rotor blade according to claim 13, wherein the tension-torsion member is a composite band member.

15. The rotor blade according to claim 13, wherein the tension-torsion member is configured to torsionally twist when the moveable airfoil member is rotated about the rotational axis.

16. The rotor blade according to claim 11, wherein the moveable airfoil member is a trailing edge flap.

17. The rotor blade according to claim 11, wherein the clevis fitting includes an upper arm positioned above the input lever and a lower arm positioned below the input lever.

18. The rotor blade according to claim 11, the actuation system further comprising:
a coupler member configured for coupling the upper drive tape and the lower drive tape to the input lever.

\* \* \* \* \*